(12) United States Patent
Ratlieff (10) Patent No.: US 10,501,150 B1
(45) Date of Patent: *Dec. 10, 2019

(54) TUNNEL VENT VENTURI FOR WATER CRAFT

(71) Applicant: William Ratlieff, Opa Locka, FL (US)

(72) Inventor: William Ratlieff, Opa Locka, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/209,307

(22) Filed: Dec. 4, 2018

Related U.S. Application Data

(62) Division of application No. 15/935,807, filed on Mar. 26, 2018, now Pat. No. 10,173,751.

(60) Provisional application No. 62/476,911, filed on Mar. 27, 2017.

(51) Int. Cl.
 *B63B 1/34* (2006.01)
 *B63B 1/12* (2006.01)
 *B63B 35/34* (2006.01)

(52) U.S. Cl.
 CPC ............... *B63B 1/34* (2013.01); *B63B 1/121* (2013.01); *B63B 35/34* (2013.01)

(58) Field of Classification Search
 CPC ........... B63B 1/34; B63B 1/121; B63B 35/34
 See application file for complete search history.

(56) References Cited

U.S. PATENT DOCUMENTS

| | | | |
|---|---|---|---|
| 3,075,488 A | 1/1963 | Wolfe et al. | |
| 3,126,856 A | 3/1964 | Fuller | |
| 3,137,261 A | 6/1964 | Noe | |
| 3,316,874 A | 5/1967 | Canazzi | |
| 3,361,104 A | 1/1968 | Glass | |
| D217,032 S | 3/1970 | Batham | |
| D217,033 S | 3/1970 | Batham | |
| D217,034 S | 3/1970 | Batham | |
| 3,726,246 A | 4/1973 | Wukowitz | |
| 3,902,445 A | 9/1975 | Stolk | |
| 4,004,534 A | 1/1977 | Allison | |
| 4,091,761 A | 5/1978 | Fehn | |
| 4,159,691 A | 7/1979 | Paxton | |
| 4,348,972 A | 9/1982 | Parsons | |
| D267,866 S | 2/1983 | Parsons | |
| 4,649,851 A | 3/1987 | April | |
| D302,969 S | 8/1989 | Pipkorn | |
| 4,890,564 A | 1/1990 | Burg | |
| D310,656 S | 9/1990 | Paine, Jr. | |
| 5,038,696 A | 8/1991 | Athanasiou et al. | |
| 5,178,085 A | 1/1993 | Hsu | |
| 5,211,126 A | 5/1993 | Johnson | |
| D336,887 S | 6/1993 | Granie et al. | |

(Continued)

*Primary Examiner* — Stephen P Avila
(74) *Attorney, Agent, or Firm* — Brian S. Steinberger; Hilary F. Steinberger; Law Offices of Brian S. Steinberger, P.A.

(57) ABSTRACT

Pontoon hulls for providing lower friction surfaces on the hulls to increase the efficiency of pontoon boats moving through the water. The inner side walls between the pontoons can be provided with a plurality of longitudinal vents. The vents can have open ends facing the stern and opposite closed ends facing the bow. As the water craft moves forward, a bubbling effect can occur in low pressure zones about the stern facing open ends of the vents to reduce the water surfaces in contact with the pontoon hull surfaces. A plurality of open rear ends of the vents can be arranged in series and in parallel on left inner sides of the left pontoon, and on right inner sides of the right pontoon.

11 Claims, 7 Drawing Sheets

(56) References Cited

U.S. PATENT DOCUMENTS

| | | | |
|---|---|---|---|
| D348,039 S | 6/1994 | Kline | |
| 5,456,201 A * | 10/1995 | Bobst | B63B 1/38 |
| | | | 114/222 |
| D378,507 S | 3/1997 | Schafer et al. | |
| 5,611,295 A | 3/1997 | Stables | |
| 5,645,003 A | 7/1997 | Grinde | |
| D382,850 S | 8/1997 | Schmidt | |
| 6,067,923 A | 5/2000 | Ratlieff, Jr. | |
| 6,164,235 A | 12/2000 | Hoppe | |
| 6,213,042 B1 | 4/2001 | Delfosse | |
| 6,250,246 B1 | 6/2001 | Hubley | |
| 6,983,713 B1 | 1/2006 | Robinson et al. | |
| 7,305,926 B2 | 12/2007 | Seider | |
| 7,677,190 B2 | 3/2010 | Miller | |
| 7,677,192 B2 | 3/2010 | Scism et al. | |
| 7,963,240 B1 | 6/2011 | Werner | |
| 7,992,507 B2 | 8/2011 | Adams | |
| 8,800,464 B1 | 8/2014 | Peters | |
| 9,387,908 B1 | 7/2016 | Paulino | |
| 10,173,751 B1 * | 1/2019 | Ratlieff | B63B 1/34 |
| 2002/0014192 A1 | 2/2002 | Takahashi et al. | |

* cited by examiner

TUNNEL VENT VENTURI FOR WATER CRAFT

CROSS REFERENCE TO RELATED APPLICATIONS

This application is a Divisional Patent Application of U.S. patent application Ser. No. 15/935,807 filed Mar. 26, 2018, now U.S. Pat. No. 10,173,751, which claims the benefit of priority to U.S. Provisional Application Ser. No. 62/476,911 filed Mar. 27, 2017. The entire disclosure of each of the applications referenced in this paragraph are incorporated by reference.

FIELD OF INVENTION

This invention relates to water craft hulls, and in particular to pontoon mono-hull water craft and multi-hull water craft, devices, systems and methods for providing side walls of longitudinal hulls and inner side walls of tunnels between pontoons, and top of a tunnel surface between the pontoons in a motorized pontoon boat with a plurality of longitudinal vent channels arranged in a U shaped configuration, with the vent channels having ends facing the rear end (stern) of the boat to be open and opposite ends facing the forward end (bow) of the boat to be closed, in order to cause lower friction surfaces on the hulls to increase the efficiency of the pontoon boats moving through the water.

BACKGROUND AND PRIOR ART

Pontoon boats have been increasingly popular over the years for providing an alternative to a monohull configuration. Providing two hulls in a pontoon arrangement, such as in a catamaran has been known to reduce drag and to result in a faster water craft. The hull on these types of water craft generally include a pair of parallel hulls each of which is comparatively long and narrow and are laterally spaced apart from one another and generally held together by a superstructure or deck. Motorized pontoon boats can work with less expensive and less powerful engines than those generally required by monohull water craft, which have a greater surface area in contact with the water.

Over the years, there have been various proposals to modify the hull surfaces on pontoon boats that have included tri-hulls, which include three laterally spaced parallel hulls, and the like. However, creating substantially more pontoons can have the effect to creating more drag and less efficiency than a pontoon boat configuration.

Other techniques have been proposed to create both a plurality of tunnels and/or through-hole channels that have both front (stern) open ends which pass water through the tunnels and channels to pass out of rear stern ends. However, small openings in the continuously open ended channels can become clogged and in effect cause uneven drag effects on the moving watercraft.

Thus, the need exists for solutions to the above problems with the prior art.

SUMMARY OF THE INVENTION

A primary objective of the present invention is to provide pontoon water craft with hulls, devices, systems and methods that generate lower friction surfaces on inner surfaces of the hulls and on top of a tunnel between the hulls to increase the efficiency of moving pontoon boats.

A secondary objective of the present invention is to provide pontoon water craft with hulls, devices, systems and methods to generate bubbling effects in low pressure zones about inner surfaces of the hulls and on top of a tunnel between the hulls to increase the efficiency of moving pontoon boats.

A third objective of the present invention is to provide pontoon water craft with hulls, devices, systems and methods of having a plurality of longitudinal vents arranged in a U shaped pattern between pontoons of the water craft, each vent having closed ends facing the bow (front) ends of the water craft and open ends facing the stern (rear) of the water craft, to increase the efficiency of moving pontoon boats.

The pontoon water craft can be a motorized pontoon boat

The inner side walls and the tunnel ceiling surface between with a plurality of longitudinal vent channels arranged in a general U shape about the tunnel between the pontoons of the water craft. The vent channels can have ends facing the rear end (stern) of the boat to be open and opposite ends facing the forward end (bow) of the boat to be closed. As the water craft moves forward, a bubbling effect can occur in low pressure zones about the rear (stern) facing open ends of the plurality of vents to reduce the water surfaces in contact with the pontoon hull surfaces.

A plurality of open rear (stern facing) ends of the vents and closed front (bow facing) ends of the vents can be arranged in series with two parallel vent channels series on a left inner sides of the left pontoon, two parallel vent channel series on a right inner sides of the right pontoon, and two parallel vent channel series on top of the tunnel between the pontoons. An upper left corner between the left pontoon and the top of the tunnel can include a plurality of longitudinal vent channels in series. And the upper right corner between the right pontoon and the top of the tunnel can include a plurality of longitudinal vent channels in series.

A multi-hull water craft can include a superstructure having a bow and a stern with an upper surface having an upper deck and a lower surface, a first longitudinal hull along a left portion of the undersurface of the water craft extending between the bow and the stern, a left longitudinal vent on an inner surface on the first longitudinal hull, the left longitudinal vent having an open end facing toward the stern of the water craft with a closed end facing the bow of the water craft, a second longitudinal hull along a right portion of the undersurface of the water craft extending between the bow and the stern, a right longitudinal vent on an inner surface on the second longitudinal hull, the right longitudinal vent having an open end facing toward the stern of the water craft with a closed end facing the bow of the water craft, wherein the open stern facing end of the left longitudinal vent and the open stern facing end of the right longitudinal vent create a lower friction surface for increasing efficiency of the water craft passing through water.

The first longitudinal hull and the second longitudinal hull can be two pontoons on a motorized pontoon water craft.

The left longitudinal vent can include a plurality of identical left inner side vents in series with one another, and the right longitudinal vent can include a plurality of identical right inner side vents in series with one another.

The left longitudinal vent can include two series of identical left inner side vents, each of the left series in parallel to one another, and the right longitudinal vent can include two series of identical right inner side vents, each of the right series in parallel to one another.

The multi-hull water craft can include a tunnel between the first longitudinal hull and the second longitudinal hull, and a middle longitudinal vent on an upper surface of the tunnel, the middle longitudinal vent having an open end facing toward the stern of the water craft with a closed end facing the bow of the water craft.

The multi-hull water craft can include a tunnel between the first longitudinal hull and the second longitudinal hull, and a plurality of middle longitudinal vents on an upper surface of the tunnel, each middle longitudinal vent having an open end facing toward the stern of the water craft with a closed end facing the bow of the water craft. The middle longitudinal vents can include a plurality of identical middle vents in series with one another. Each of the middle series of longitudinal vents can be in parallel to one another.

The multi-hull water craft can include an upper left corner longitudinal vent between the inner side of the first longitudinal hull and the upper surface of the tunnel, and an upper right corner longitudinal vent between the inner side of the second longitudinal hull and the upper surface of the tunnel.

The multi-hull water craft can include a plurality of upper left corner longitudinal vents between the inner side of the first longitudinal hull and the upper surface of the tunnel and a plurality of upper right series of longitudinal vents between the inner side of the second longitudinal hull and the upper surface of the tunnel.

A multi-hull water craft can include a superstructure having a bow and a stern with an upper surface having an upper deck and a lower surface, a first longitudinal pontoon along a left portion of the undersurface of the water craft extending between the bow and the stern, a second longitudinal pontoon along a right portion of the undersurface of the water craft extending between the bow and the stern, and a plurality of longitudinal vents arranged in a U shaped configuration along inner surfaces of the first and second longitudinal pontoons, and along a top surface of a tunnel formed between the first and the second longitudinal pontoons, each of the longitudinal vents having an open end facing toward the stern of the water craft and a closed end facing the bow of the water craft, wherein the open stern facing ends of the longitudinal vents create a lower friction surface for increasing efficiency of the water craft passing through water.

The plurality of longitudinal vents can include a first parallel pair of two series of the longitudinal vents along an inner facing side of the first longitudinal pontoon, a second parallel pair of plural series of the longitudinal vents along an inner facing side of the second longitudinal pontoon, a middle parallel pair of plural series of the longitudinal vents along a top surface of the tunnel between the first and the second longitudinal pontoons, an upper left corner series of longitudinal vents between the inner facing side of the first longitudinal pontoon and the top surface of the tunnel between the first and the second longitudinal pontoons and an upper right corner series of longitudinal vents between the inner facing side of the second longitudinal pontoon and the top surface of the tunnel between the first and the second longitudinal pontoons.

A method of increasing efficiency of multi-hull water craft, can include the steps of: providing a superstructure having a bow and a stern with an upper surface having an upper deck and a lower surface, providing a first longitudinal hull along a left portion of the undersurface of the water craft extending between the bow and the stern, providing a second longitudinal hull along a right portion of the undersurface of the water craft extending between the bow and the stern, generating lower friction surfaces in a U shaped configuration of longitudinal vents located between the first and the second longitudinal hulls and the top surface of a tunnel formed between the first and the second longitudinal hulls, and increasing efficiency of the water craft travelling through the water with low friction surfaces.

The step of generating the lower friction surfaces can include the steps of providing a plurality of left longitudinal vents on an inner facing surface of the first longitudinal hull, each of the left longitudinal vents having an open end facing toward the stern of the water craft with a closed end facing the bow of the water craft and providing a plurality of right longitudinal vents on an inner facing surface of the second longitudinal hull, each of the right longitudinal vents having an open end facing toward the stern of the water craft with a closed end facing the bow of the water craft.

The step of generating the lower friction surfaces can include the step of providing a plurality of top tunnel longitudinal vents on an inner facing surface of the top surface of the tunnel between the first and the second longitudinal hulls.

The method can include the steps of: providing a plurality of upper left corner longitudinal vents between an inner facing surface of the first longitudinal hull and the top surface of the tunnel, each of the upper left corner longitudinal vents having an open end facing toward the stern of the water craft with a closed end facing the bow of the water craft, and providing a plurality of upper right corner longitudinal vents between an inner facing surface of the second longitudinal hull and the top surface of the tunnel, each of the upper right corner longitudinal vents having an open end facing toward the stern of the water craft with a closed end facing the bow of the water craft.

The method can include the steps of: providing two series of identical left inner side vents, each of the left series in parallel to one another and providing two series of identical right inner side vents, each of the right series in parallel to one another.

The method can include the step of: providing a plurality of identical middle vents along the top surface of the tunnel formed between the first and the second longitudinal pontoons.

The method can include the steps of providing a plurality of upper left corner vents between the left inner side vents and the top surface of the tunnel, and providing a plurality of upper right corner vents between the left inner side vents and the top surface of the tunnel.

The method can include the step of providing the first longitudinal hull and the second longitudinal hulls as two pontoons on a motorized pontoon water craft.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
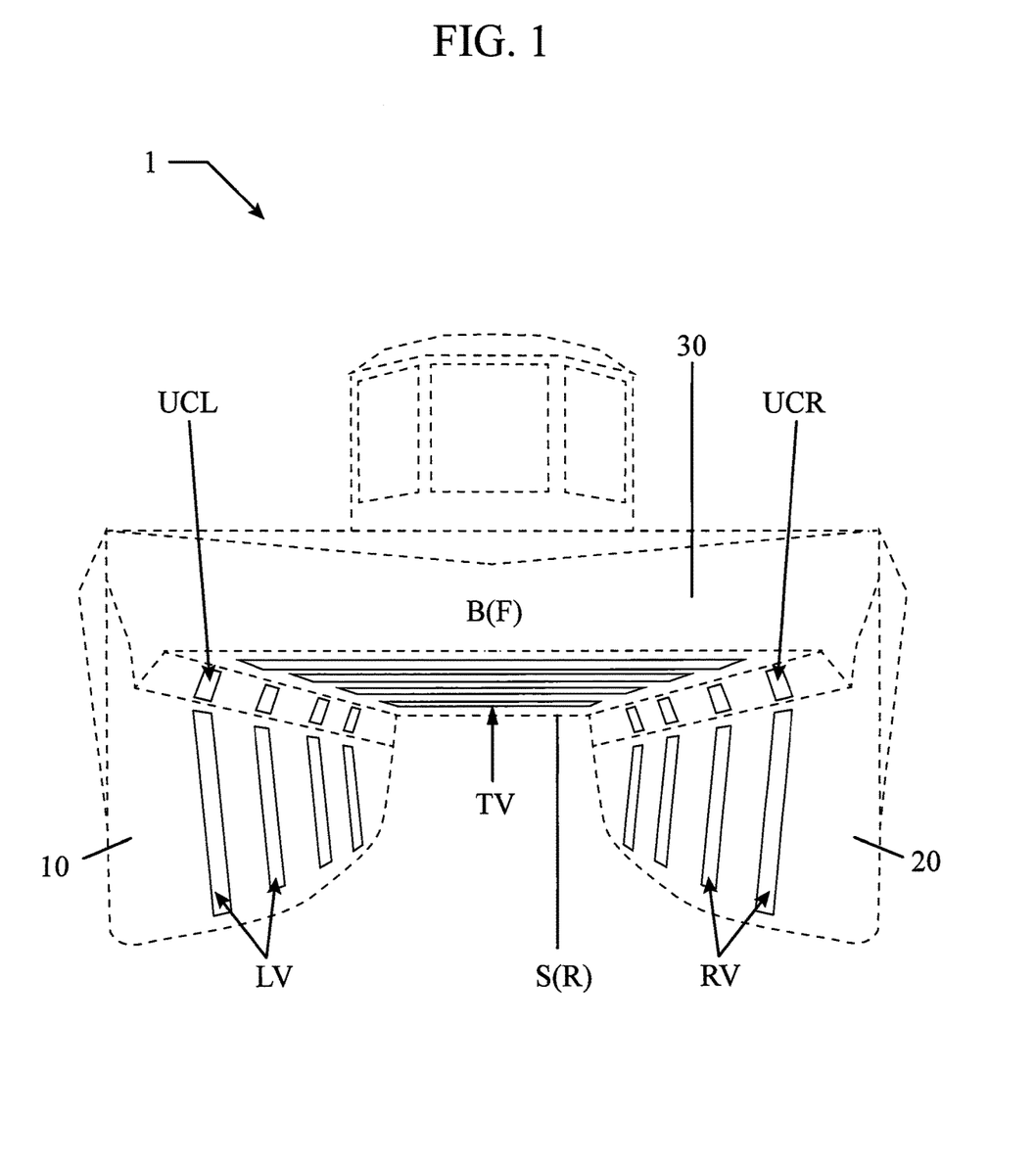
FIG. 1 is a front perspective view of a motorized pontoon water craft with the U shaped arrangement of the novel longitudinal vent channels.

A list of components will now be described.
1 motorized pontoon water craft
10 left pontoon
20 right pontoon
30 superstructure with upper deck
B(F) Bow (front end)
S (R) Stern (rear end)
LV longitudinal vents along inner side surface of the left Pontoon
RV longitudinal vents along inner side surface of the right pontoon
TV longitudinal vents along top surface of the tunnel under the superstructure
100 single longitudinal vent
110 raised panel
115 open end
118 tapered closed end
120 top triangular side
130 bottom triangular side
140 support FIG. 1 is a front (bow end) perspective view of a motorized pontoon water craft 1 with the U shaped arrangement of the novel longitudinal vent channels LV, UCL, TV, RV formed inner surfaces of the left pontoon 10 and right pontoon 20 and the top surface of the tunnel under the superstructure 30 formed between the pontoons 10, 20.

Figure 2:
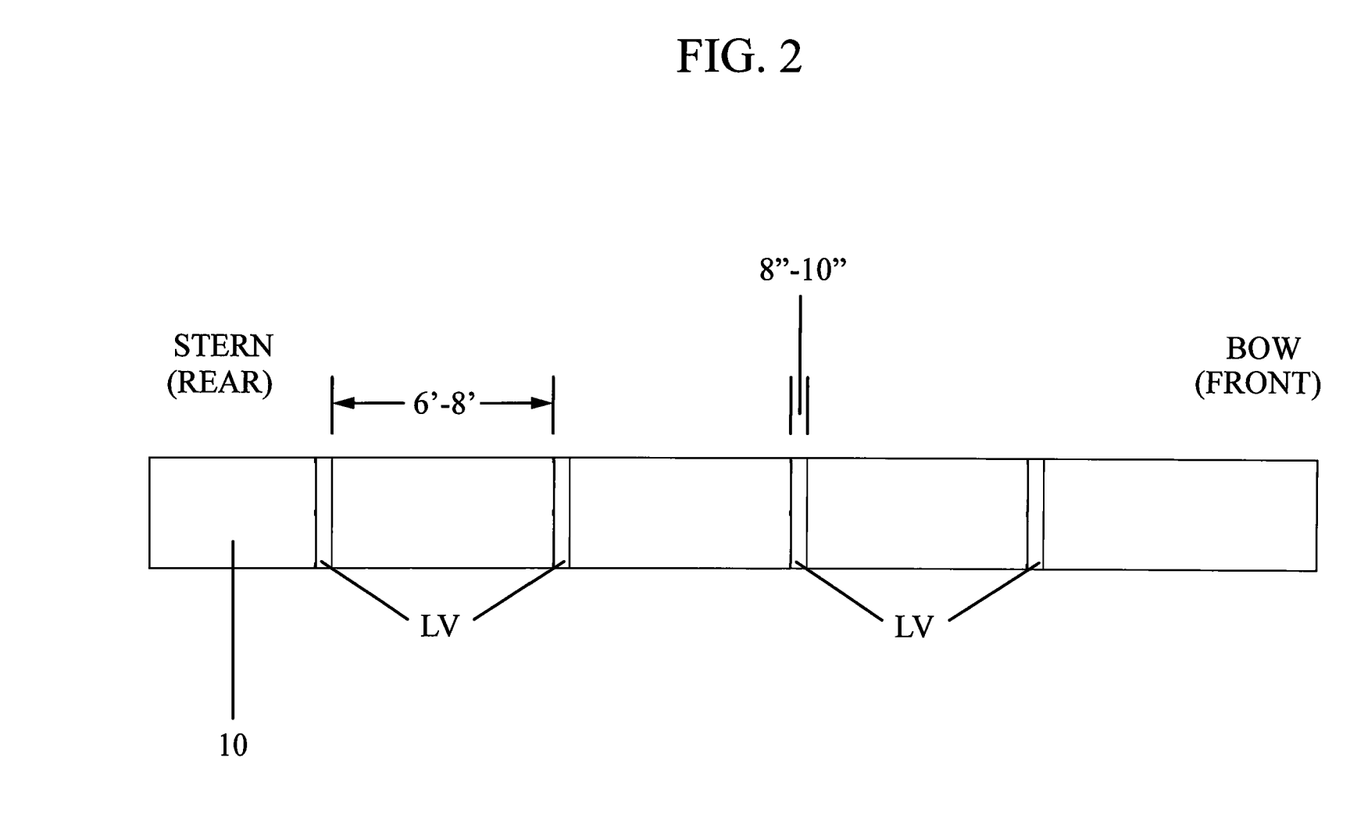
FIG. 2 an inner side wall of a left pontoon of the pontoon water craft of FIG. 1 with a plurality of longitudinal vents in series.

FIG. 2 an inner side wall of a left pontoon 10 of the pontoon water craft 1 of FIG. 1 with a plurality of longitudinal vents LV in series.

Figures 3A, 3B:
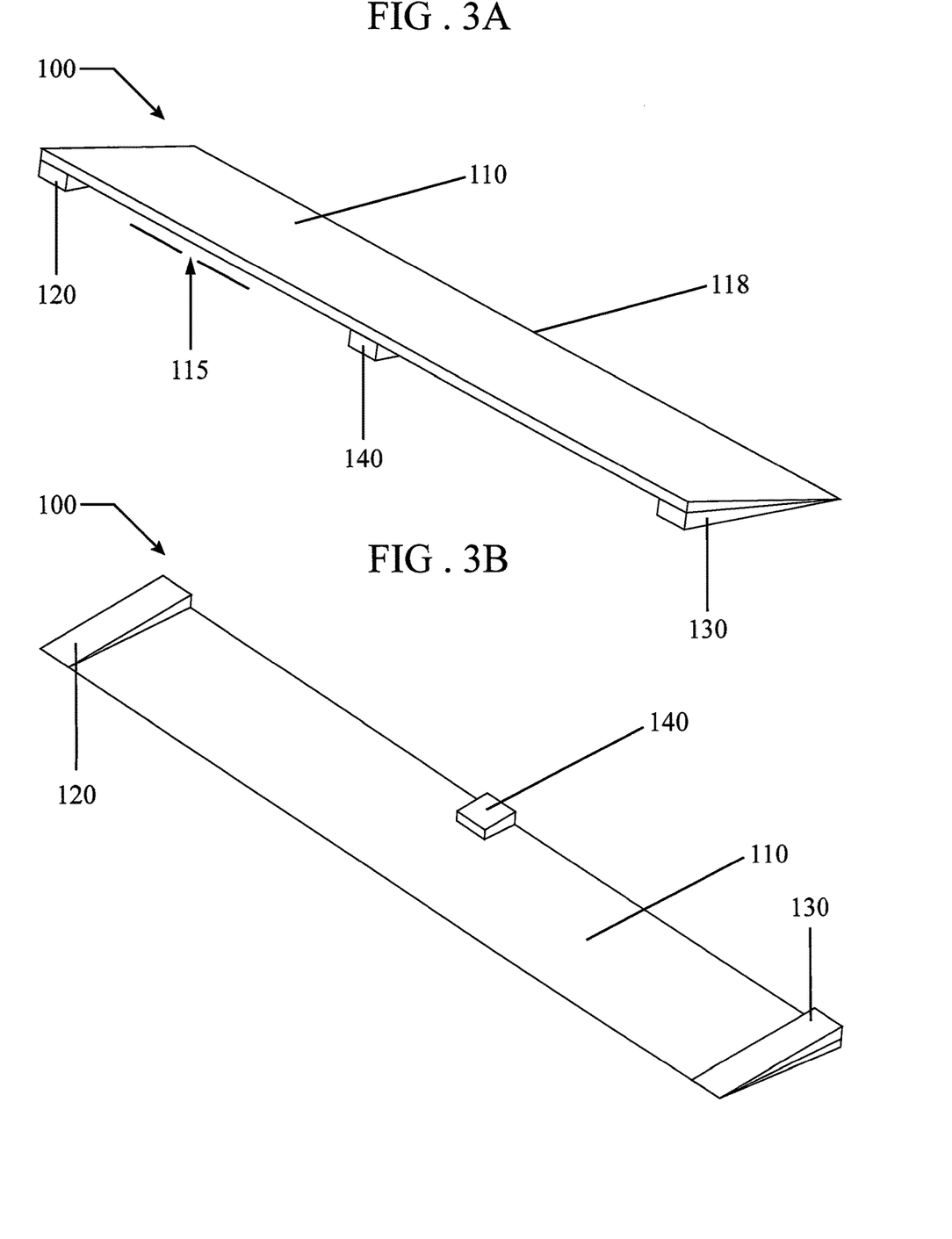
FIG. 3A is an enlarged upper perspective view of a single vent of FIGS. 1-2 with a support in the open end of the vent.
FIG. 3B is a lower perspective view of the single vent of FIG. 3A.
Figure 4:
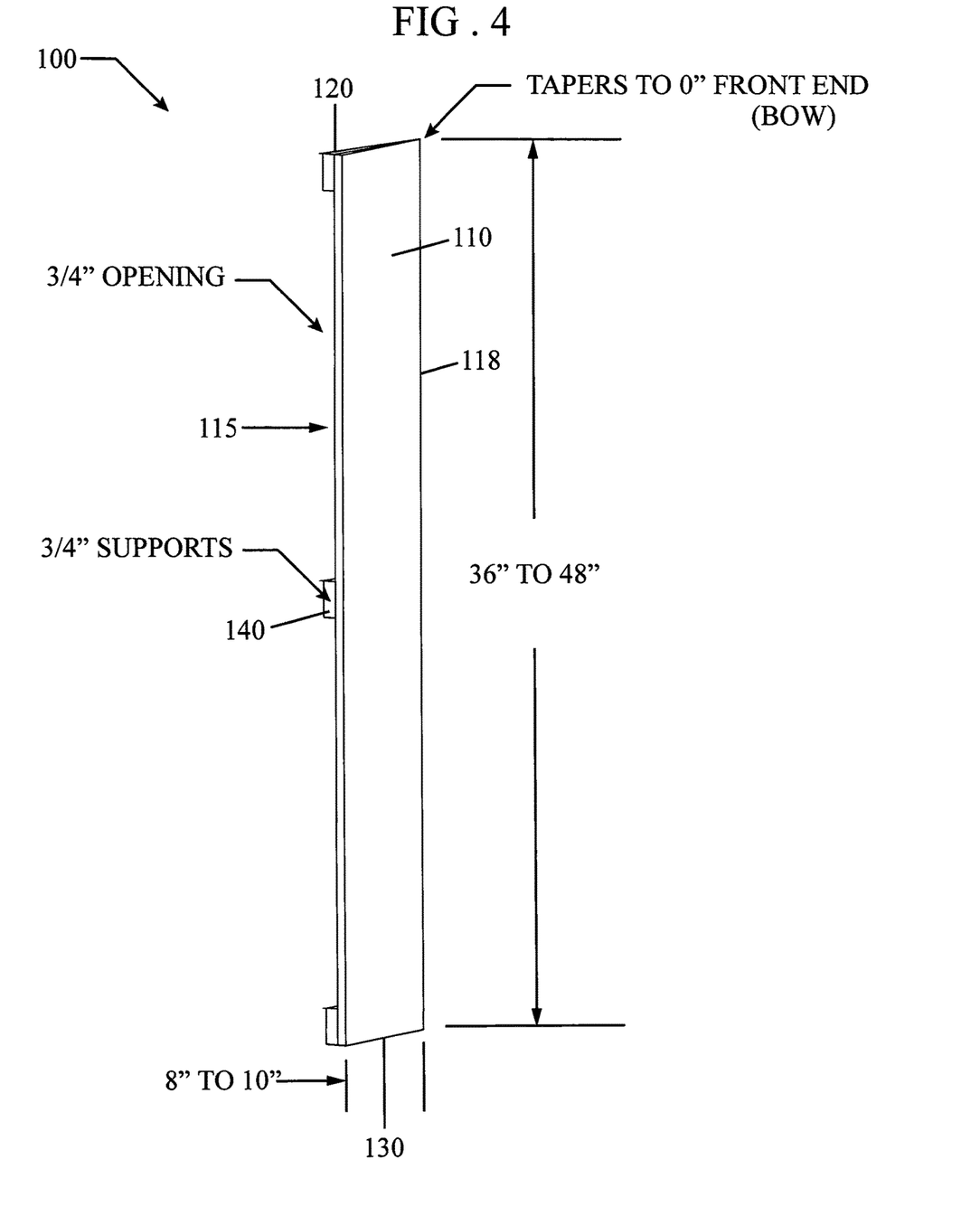
FIG. 4 is another perspective view of the vent of FIG. 3A with exemplary dimensions.

FIG. 3A is an enlarged upper perspective view of a single left longitudinal vent (LV) of FIGS. 1-2 with a support 140 in the open end 115 of the left longitudinal vent 100. FIG. 3B is a lower perspective view of the single left longitudinal vent 100 of FIG. 3A. FIG. 4 is another perspective view of the left longitudinal vent (LV) 100 of FIG. 3A with exemplary dimensions.

Referring to FIGS. 1-4, a motorized water craft having a pair of pontoons 10, 20 with a superstructure there between can be fitted with a U shape configuration of longitudinal vent type channels 100 spaced apart from one another formed between the bow (front) and stern (rear) of the water craft. A left inner wall of the left pontoon 10 can have a plurality of longitudinal vents LV spaced apart from one another formed between the bow (front) and stern (rear) of the water craft. A right inner wall of the right pontoon 20 can have a plurality of longitudinal vents RV spaced apart from one another formed between the bow (front) and stern (rear) of the water craft.

Each of the longitudinal vents (LV, RV) 100 can have a horizontal length of approximately 8 inches to approximately 10 inches, a height of approximately 36 inches to approximately 48 inches with a spacer 140 formed therein. The longitudinal vent 100 can have an open end 115 facing the bow (rear end) of the water craft having an approximately ¾ inch opening which tapers down to a closed opposite end 118.

In a preferred embodiment, the longitudinal vents can be spaced approximately 4 feet to approximately 8 feet apart from one another, in a water craft having a length between the bow and stern of approximately 30 to approximately 50 feet in length. The length between the bow and the stern can be less than approximately 30 feet and more than approximately 50 feet.

The top of the tunnel formed between the pontoons 10, 20 can also be fitted with a plurality of longitudinal vents TV on the lower surface of a superstructure 30 having a deck on an upper surface spaced apart from one another formed between the bow (front) and stern (rear) of the water craft. The longitudinal vents TV on the top of the tunnel can have similar dimensions to those of the left vents LV, and right vents RV with the exception of the height dimension now being horizontal and being proportionately shorter in length based on the spacing between the pontoons 10, 20.

Additionally, the upper left corner along an approximately 45 degree surface formed between the inner facing side of the left pontoon 10 and the top of the tunnel can have a series of spaced apart longitudinal vent channels UCL. These vent channels UCL can have similar dimensions and spacing to the left longitudinal vents and right longitudinal vents, with the difference of having a height of approximately 10 inches.

Similarly, the upper right corner along an approximately 45 degree surface formed between the inner facing side of the right pontoon 20 and the top of the tunnel can have a series of spaced apart longitudinal vent channels UCR. These vent channels UCR can have similar dimensions and spacing to the left longitudinal vents and right longitudinal vents, with the difference of having a height of approximately 10 inches.

All of the longitudinal vents referenced above can be preferably formed on the inner surfaces of the pontoon and under the superstructure when the pontoon water craft.

In the invention, the longitudinal vents were formed by laminating approximately 150 oz of fiberglass reinforcement of approximately ¼ inch in thickness, applied onto a flat mold. After which they are then cut in the appropriate size for each longitudinal vent.

The longitudinal vents can be made part of the pontoons when the pontoon boat is originally built, by molding and the like. Alternatively, the longitudinal vents can be added onto existing pontoon boats.

Figure 5:
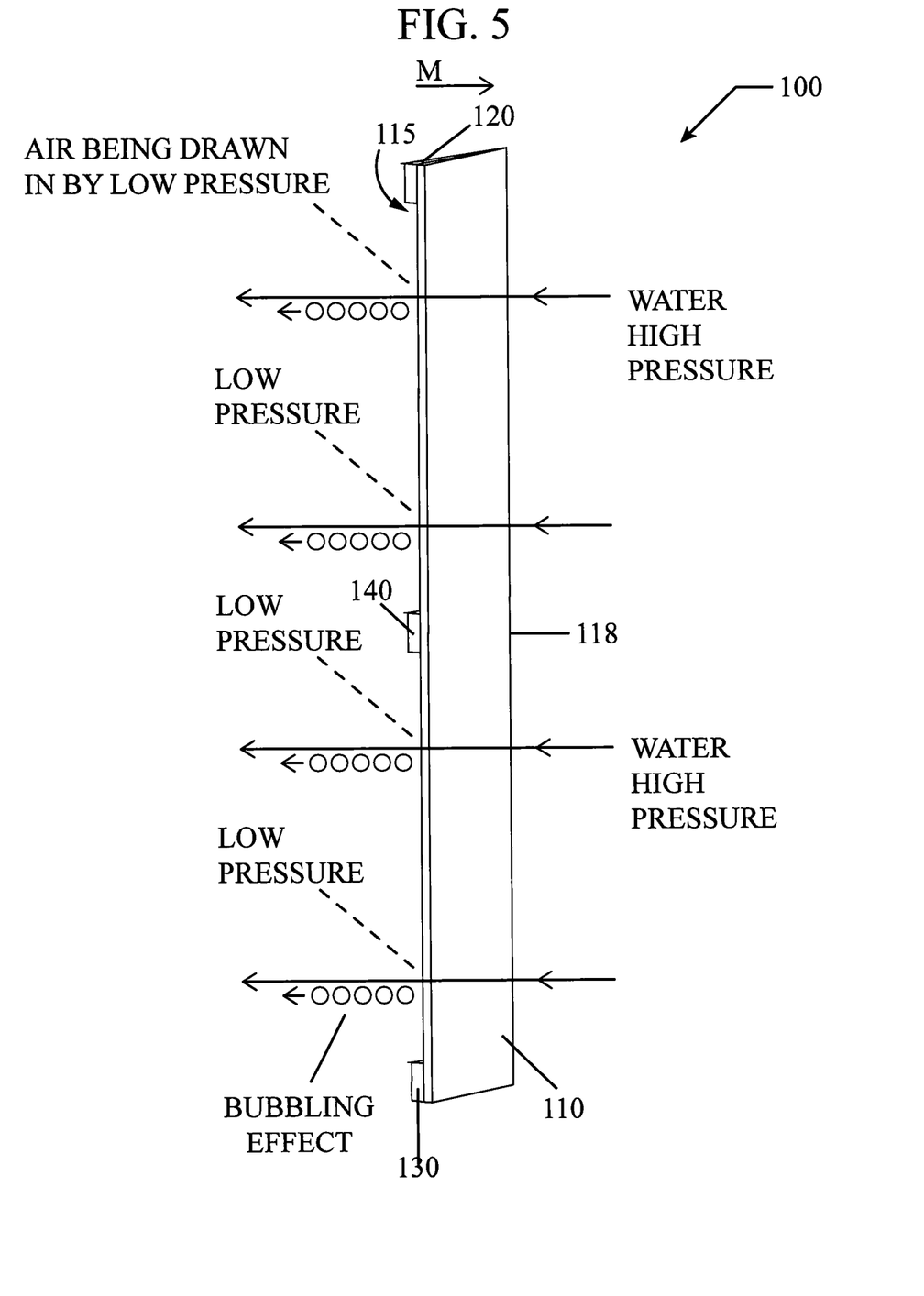
FIG. 5 is another perspective view of the vent of FIGS. 3A-4 showing high pressure waterflow with air forming in the open vent ends forming low pressure zones while the pontoon water craft is moving in a forward direction through the water.
Figure 6:
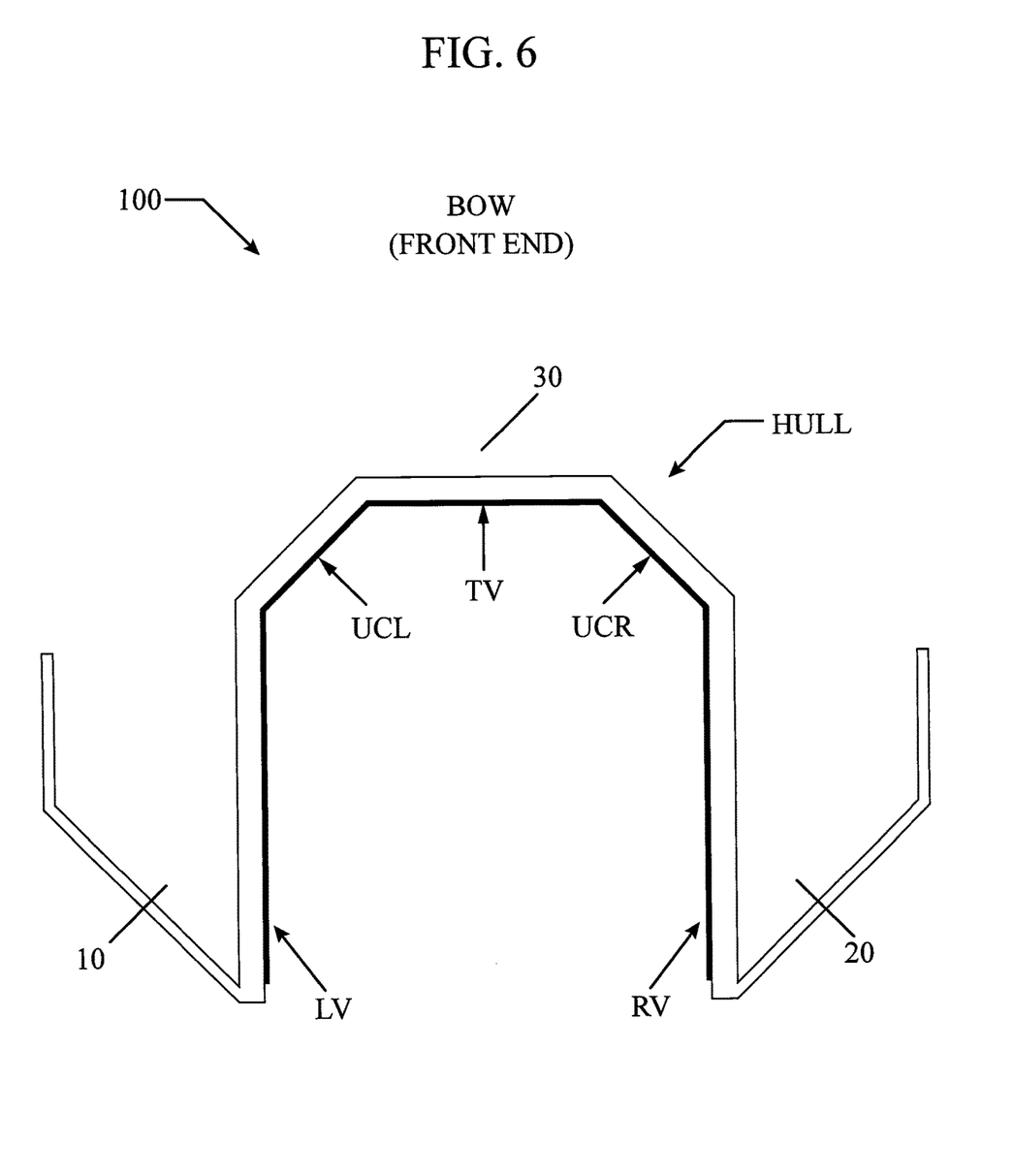
FIG. 6 shows the bow (front) end view of the motorized pontoon water craft of FIG. 1.
Figure 7:
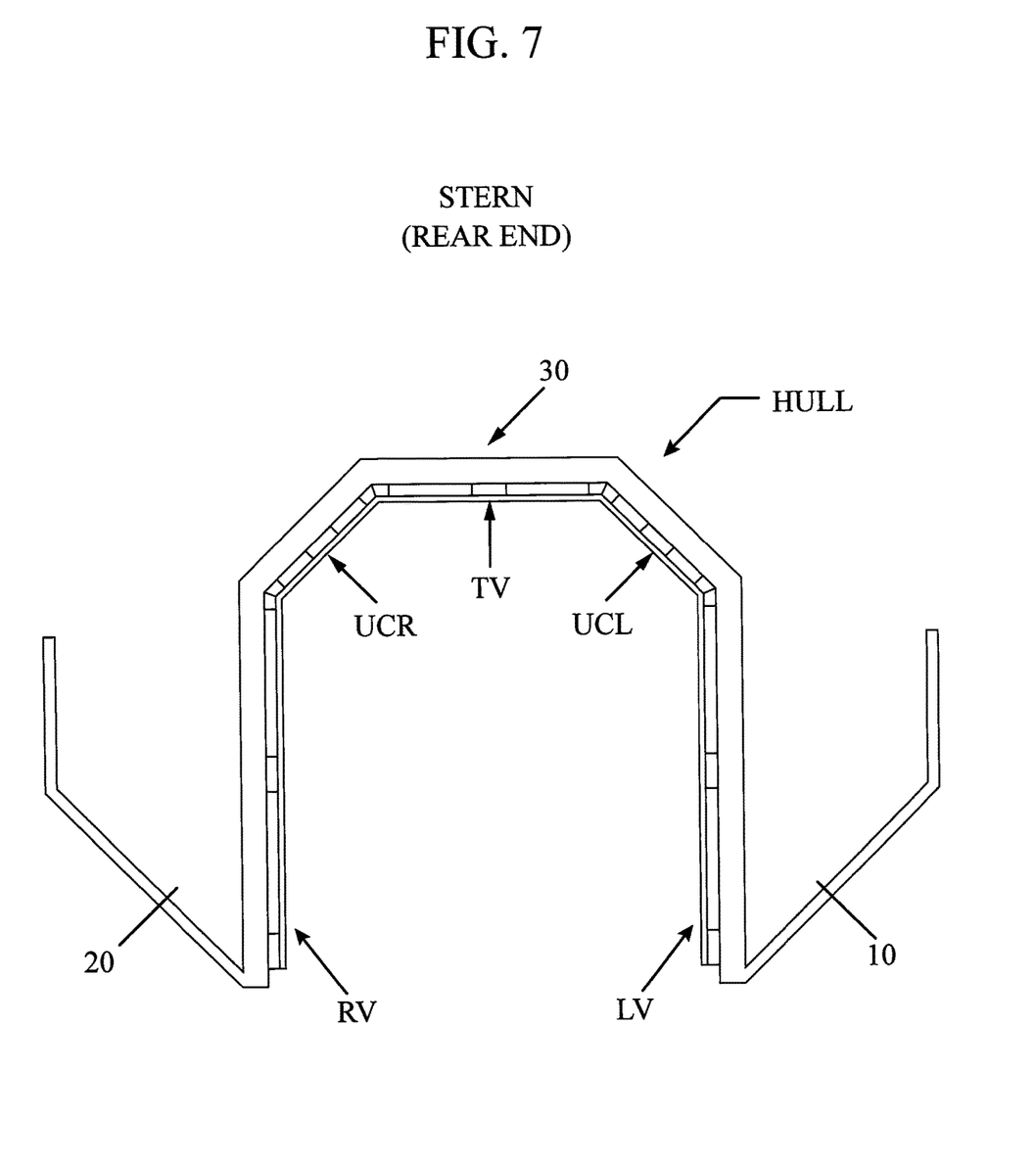
FIG. 7 shows the stern (rear) end view of the motorized pontoon water craft of FIG. 1.

FIG. 5 is another perspective view of the vent 100 of FIGS. 3A-4 showing high pressure waterflow with air forming in the open vent ends 115 forming low pressure zones while the bow (front) end of the pontoon water craft is moving in a forward direction along arrow M through the water. FIG. 6 shows the bow (front) end view of the motorized pontoon water craft of FIG. 1. FIG. 7 shows the stern (rear) end view of the motorized pontoon water craft of FIG. 1.

Referring to FIGS. 1-7, as the water craft is moving forward high pressure water passes over the inner facing sides of the left pontoon 10 and the right pontoon 20. Also, while the water craft is moving in the direction of arrow M, high pressure water can pass along the upper left corner formed between the left pontoon and the top of the tunnel, the top surface of the tunnel, and the upper right corner formed between the top surface of the tunnel and the inner facing sides of the right pontoon 20.

While the water craft is traveling in the direction of arrow M, a low pressure can form in the open end 115 of the vents 100 forming a low pressure zone. The resulting the low pressure zone entrains air which reduces surface tension. The reduced surface tension and friction can improve the efficiency of the pontoon boats moving through the water.

Experiments were done with motorized pontoon boats. With a case study of a 36 Prowler Prototype pontoon boat without longitudinal vents speed was measured at 58 mph running fuel. With 2 vents added per inner side, speed went up to 62.5 mph with an approximately 8% gain in efficiency and speed using the same fuel, same engine as if there were no vents. Adding 4 longitudinal vents per inner side, speed went up to 64.8 mph with an approximately 11% gain in efficiency and speed using the same fuel, same engine as if there were no vents.

With a second test of a 42 Prowler, without vents, speed was measured at 58 mph. Adding 2 longitudinal vents per inner side, speed went up to 55.2 mph with an approximately 8% gain in efficiency and speed, using the same fuel, same engine as if there were no vents.

Although the preferred embodiments include dimensions on the longitudinal vents, and spacing, these numbers can change based on size (width, length, and the like) of the water craft, size (width, length, and the like) of the pontoons.

While the preferred embodiments show a pontoon boat with two pontoons, the invention can be used in other multi-hull water craft having three or more hulls, and the like.

Although the preferred embodiments describe motorized multi-hull applications, the invention can be used with other multi-hull water craft, such as sailboats, such as catamarans, and the like.

Although the longitudinal vents are shown in the inner sides of pontoons, the longitudinal vents can be used on outer sides of pontoons, and the like, as well as be used on a mono-hull, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A multi-hull water craft, comprising:
a superstructure having a bow and a stern with an upper surface having an upper deck and an undersurface;
three pontoons on the undersurface of the water craft, each of the pontoons extending between the bow and the stern;
a first plurality of side vents on inner sides of a first tunnel formed between a first pontoon and a second pontoon, wherein the first plurality of side vents each have an open end facing toward the stern of the water craft with a closed end facing the bow of the water craft; and
a second plurality of side vents on inner sides of a second tunnel formed between the second pontoon and a third pontoon wherein the second plurality of side vents each have an open end facing toward the stern of the water craft with a closed end facing the bow of the water craft, wherein the open stern facing ends of the first plurality of vents and the second plurality of vents creates a lower friction surface for increasing efficiency of the water craft passing through water.

2. The multi-hull water craft of claim 1, wherein the first plurality of side vents are in series with one another, and the second the plurality of side vents are in series with one another.

3. The multi-hull water craft of claim 1, wherein the first plurality of side vents are in parallel with one another, and the second the plurality of side vents are in parallel with one another.

4. The multi-hull water craft of claim 1, wherein the first tunnel and the second tunnel each include:
a middle longitudinal vent on an upper surface of each tunnel, the middle longitudinal vent having an open end facing toward the stern of the water craft with a closed end facing the bow of the water craft.

5. The multi-hull water craft of claim 1, wherein each tunnel includes:
an upper left corner longitudinal vent; and
an upper right corner longitudinal vent.

6. The multi-hull water craft of claim 1, wherein each tunnel includes:
a plurality of upper left corner longitudinal vents; and
a plurality of upper right corner longitudinal vents.

7. The multi-hull water craft of claim 6, wherein the plurality of upper left corner longitudinal vents are in series with one another, and the plurality of upper right corner longitudinal vents are in series with one another.

8. The multi-hull water craft of claim 1, wherein the first plurality of side vents are identical with one another, and the second plurality of side vents are identical with one another.

9. A multi-hull water craft, comprising:
a superstructure having a bow and a stern with an upper surface having an upper deck and a lower surface;

a first longitudinal hull along a left portion of the undersurface of the water craft extending between the bow and the stern;

a plurality of left longitudinal side vents in parallel to one another on an inner surface on the first longitudinal hull, each of the left longitudinal side vents having an open end facing toward the stern of the water craft with a closed end facing the bow of the water craft;

a second longitudinal hull along a right portion of the undersurface of the water craft extending between the bow and the stern;

a plurality of right longitudinal side vents in series to one another on an inner surface on the second longitudinal hull, each of the right longitudinal side vents having an open end facing toward the stern of the water craft with a closed end facing the bow of the water craft, wherein the open stern facing ends of the left longitudinal side vents and the open stern facing ends of the right longitudinal side vents create a lower friction surface for increasing efficiency of the water craft passing through water.

10. The multi-hull water craft of claim 9, wherein the left longitudinal side vents are identical, and wherein the right longitudinal side vents are identical.

11. A multi-hull water craft, comprising:

a superstructure having a bow and a stern with an upper surface having an upper deck and a lower surface;

a first longitudinal hull along a left portion of the undersurface of the water craft extending between the bow and the stern;

a plurality of left longitudinal side vents in series to one another on an inner surface on the first longitudinal hull, each of the left longitudinal side vents having an open end facing toward the stern of the water craft with a closed end facing the bow of the water craft;

a second longitudinal hull along a right portion of the undersurface of the water craft extending between the bow and the stern;

a plurality of right longitudinal side vents in series to one another on an inner surface on the second longitudinal hull, each of the right longitudinal side vents having an open end facing toward the stern of the water craft with a closed end facing the bow of the water craft, wherein the open stern facing ends of the left longitudinal side vents and the open stern facing ends of the right longitudinal side vents create a lower friction surface for increasing efficiency of the water craft passing through water.

* * * * *